(12) United States Patent
Wu et al.

(10) Patent No.: US 12,069,608 B2
(45) Date of Patent: Aug. 20, 2024

(54) PAGING INDICATION METHOD, APPARATUS, AND SYSTEM

(71) Applicant: VIVO MOBILE COMMUNICATION CO., LTD., Guangdong (CN)

(72) Inventors: Kai Wu, Chang'an Dongguan (CN); Dajie Jiang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 725 days.

(21) Appl. No.: 17/148,393

(22) Filed: Jan. 13, 2021

(65) Prior Publication Data

US 2021/0136725 A1 May 6, 2021

Related U.S. Application Data

(63) Continuation of application No. PCT/CN2019/096177, filed on Jul. 16, 2019.

(30) Foreign Application Priority Data

Jul. 16, 2018 (CN) .......................... 201810778378.2

(51) Int. Cl.
*H04W 72/23* (2023.01)
*H04W 68/00* (2009.01)
(Continued)

(52) U.S. Cl.
CPC ..... *H04W 68/005* (2013.01); *H04W 72/0446* (2013.01); *H04W 72/0453* (2013.01); *H04W 72/23* (2023.01)

(58) Field of Classification Search
CPC ........... H04W 68/005; H04W 72/0446; H04W 72/0453; H04W 72/23; H04W 68/00;
(Continued)

(56) References Cited

U.S. PATENT DOCUMENTS 9,681,416 B2    6/2017 Lee et al.
2009/0129335 A1 5/2009 Lee et al.
(Continued)

FOREIGN PATENT DOCUMENTS

CN    101554082 A    10/2009
CN    101577886 A    11/2009
(Continued)

OTHER PUBLICATIONS

CN Search Report in Application No. 201810778378.2 dated Apr. 2, 2020.
(Continued)

*Primary Examiner* — Julio R Perez
(74) *Attorney, Agent, or Firm* — Brooks Kushman P.C.

(57) ABSTRACT

A paging indication method, apparatus, and system are provided, which relate to the field of communications technologies, to solve a problem that power consumption of UE is high because the UE blindly detects a PDCCH periodically. A specific solution includes: receiving, by UE, indication information from a network side device, where the indication information is used to indicate a detection parameter used by the UE to detect a paging message, and the detection parameter is used to determine a detection manner used by the UE to detect the paging message; and determining the detection manner based on the detection parameter. The embodiments of the present invention are applied to a process in which the UE determines a detection manner used to detect the paging message.

20 Claims, 4 Drawing Sheets

(51) Int. Cl.
*H04W 72/0446* (2023.01)
*H04W 72/0453* (2023.01)

(58) Field of Classification Search
CPC ......... H04W 52/0216; H04W 52/0219; H04W 68/02; H04L 1/0038; Y02D 30/70
See application file for complete search history.

(56) References Cited

U.S. PATENT DOCUMENTS

| | | | | |
|---|---|---|---|---|
| 2010/0067418 | A1* | 3/2010 | Parkvall | H04W 68/02 375/260 |
| 2017/0339667 | A1 | 11/2017 | Shen et al. | |
| 2019/0239093 | A1* | 8/2019 | Zhang | H04L 5/001 |
| 2021/0297985 | A1* | 9/2021 | Liu | H04L 5/0053 |
| 2023/0224878 | A1* | 7/2023 | Lei | H04W 72/51 370/329 |

FOREIGN PATENT DOCUMENTS

| | | | | |
|---|---|---|---|---|
| CN | 103209395 | A | | 7/2013 |
| CN | 104811279 | A | | 7/2015 |
| CN | 105493591 | A | | 4/2016 |
| CN | 105813200 | A | | 7/2016 |
| CN | 106332281 | A | | 1/2017 |
| CN | 107911865 | A | | 4/2018 |
| CN | 114731676 | A | * | 7/2022 |
| EP | 1 223 775 | A1 | | 7/2002 |
| EP | 3598814 | A1 | * | 1/2020 ............ H04W 36/08 |
| WO | 2017079574 | A1 | | 5/2017 |
| WO | WO-2020015640 | A1 | * | 1/2020 ............ H04L 1/0038 |
| WO | WO-2021183026 | A1 | * | 9/2021 ............ H04L 5/001 |
| WO | WO-2021204434 | A1 | * | 10/2021 ............ H04W 68/02 |
| WO | WO-2022082107 | A1 | * | 4/2022 ......... H04W 72/044 |
| WO | WO-2022240847 | A2 | * | 11/2022 |

OTHER PUBLICATIONS

Written Opinion and International Search Report in Application No. PCT/CN2019/096177 dated Sep. 26, 2019.
EP Search Report in Application No. 19838220.2 dated Jul. 30, 2021.
"Timing Relationships for MTC" 3GPP TSG-RAN WG1 Meeting #81, Nokia Networks, R1-152539, May 25, 2015.
"CORESET configuration and search space design" 3GPP TSG RAN WG1 Meeting #90bis, Huawei, HiSilicon, R1-1717062, Oct. 9, 2017.
"NR paging design" 3GPP TSH RAN WG1 #91, Motorola Mobility, Lenovo, R1-1720921, Nov. 27, 2017.
"Summary on remaining details on Paging" 3GPP TSG RAN WG1 Meeting #NR-AH3, Huawei, R1-171xxxx, Sep. 18, 2017.
Ericsson, "Paging in DCI only—Text Proposal to TS 38.331," 3GPP TSG-RAN WG2 #102, R2-1806806, May 21-25, 2018, pp. 1-2.
Ericsson, "Configuration of POs within a PF," 3GPP TSG-RAN WG2 AH 1807, R2-1809723, Jul. 2-6, 2018, pp. 1-5.
Ericsson, "Correction to the configuration of POs within a PF," 3GPP TSG-RAN WG2 AH 1807, R2-1809724, Jul. 2-6, 2018, pp. 1-3.
Ericsson, "On the need to notify RAN1 of the PDSCH resource allocation requirements for paging," 3GPP TSG-RAN WG2 AH-1807, R2-1809623, Jul. 2-6, 2018, pp. 1-2.
VIVO, "Discussion on RAN1 Ls for clarification of PF and PO configuration," 3GPP TSG-RAN WG2 Meeting #103 bis, R2-1814186, Oct. 8-12, 2018, pp. 1-4.
VIVO, "Paging enhancement for power saving," 3GPP TSG-RAN WG2 Meeting #105, R2-1900394, Feb. 25-Mar. 1, 2019, pp. 1-3.
Indian Office Action from corresponding IN Application No. 202127004084, Jan. 13, 2022.
Japanese Office Action from corresponding JP Application No. 2021-501031, Mar. 15, 2022.

* cited by examiner

PAGING INDICATION METHOD, APPARATUS, AND SYSTEM

This application is a continuation application of PCT International Application No. PCT/CN2019/096177 filed on Jul. 16, 2019, which claims priority to Chinese Patent Application No. 201810778378.2, filed with the China National Intellectual Property Administration on Jul. 16, 2018, and entitled "PAGING INDICATION METHOD, APPARATUS, AND SYSTEM", both disclosures of which are incorporated herein by reference in their entireties.

TECHNICAL FIELD

Embodiments of the present invention relate to the field of communications technologies, and in particular, to a paging indication method, apparatus, and system.

BACKGROUND

In a communications system, user equipment (User Equipment, UE) in an idle (Idle) mode may blindly detect a physical downlink control channel (Physical Downlink Control Channel, PDCCH) within preconfigured duration, to determine whether a base station has sent a paging message to the UE.

Specifically, the UE may blindly detect the PDCCH, and if the UE detects a paging PDCCH, the UE may continue to detect a physical downlink shared channel (Physical Downlink Shared Channel, PDSCH) indicated in the paging PDCCH, to determine whether the PDSCH includes the paging message of the UE. Generally, the UE blindly detects the PDCCH periodically. However, because the UE possibly may not detect the paging message of the UE in each period, periodical blind detection of the UE on the PDCCH causes high power consumption of the UE.

SUMMARY

Embodiments of the present invention provide a paging indication method, apparatus, and system, to solve a problem that power consumption of UE is high because the UE blindly detects a PDCCH periodically.

To solve the foregoing technical problem, the following technical solutions are used in the embodiments of the present invention:

According to a first aspect, an embodiment of the present invention provides a paging indication method, applied to UE, where the paging indication method includes: receiving indication information from a network side device, where the indication information is used to indicate a detection parameter used by the UE to detect a paging message, and the detection parameter is used to determine a detection manner used by the UE to detect the paging message; and determining the detection manner based on the detection parameter.

According to a second aspect, an embodiment of the present invention provides a paging indication method, applied to a network side device, where the paging indication method includes: sending indication information to UE, where the indication information is used to indicate a detection parameter used by the UE to detect a paging message, and the detection parameter is used to determine a detection manner used by the UE to detect the paging message.

According to a third aspect, an embodiment of the present invention provides UE, where the UE includes: a receiving unit and a determining unit. The receiving unit is configured to receive indication information from a network side device, where the indication information is used to indicate a detection parameter used by the UE to detect a paging message, and the detection parameter is used to determine a detection manner used by the UE to detect the paging message. The determining unit is configured to determine the detection manner based on the detection parameter.

According to a fourth aspect, an embodiment of the present invention provides a network side device, where the network side device includes a sending unit. The sending unit is configured to send indication information to UE, where the indication information is used to indicate a detection parameter used by the UE to detect a paging message, and the detection parameter is used to determine a detection manner used by the UE to detect the paging message.

According to a fifth aspect, an embodiment of the present invention provides UE, where the UE includes: a processor, a memory, and a computer program stored in the memory and executable on the processor, where the computer program, when executed by the processor, implements the steps of the paging indication method according to the foregoing first aspect.

According to a sixth aspect, an embodiment of the present invention provides a network side device, where the network side device includes: a processor, a memory, and a computer program stored in the memory and executable on the processor, where the computer program, when executed by the processor, implements the steps of the paging indication method according to the foregoing second aspect.

According to a seventh aspect, an embodiment of the present invention provides a communications system, where the communications system includes the UE according to the foregoing third aspect and the network side device according to foregoing fourth aspect. Alternatively, the communications system includes the UE according to the foregoing fifth aspect and the network side device according to the foregoing sixth aspect.

According to an eighth aspect, an embodiment of the present invention provides a computer readable storage medium, where the computer readable storage medium stores a computer program, and the computer program, when executed by a processor, implements the steps of the paging indication method according to the foregoing first aspect or second aspect.

In the embodiments of the present invention, the UE can receive the indication information (the indication information is used to indicate the detection parameter used by the UE to detect the paging message) from the network side device, and determine the detection manner based on the detection parameter. Because the UE can determine, based on the detection parameter that is indicated in the indication information sent by the network side device and that is used by the UE to detect the paging message, the detection manner used by the UE to detect the paging message, and does not need to periodically detect the paging message or determine the detection manner used to detect the paging message, a quantity of times of detecting, by the UE, the paging message can be reduced, and the detection manner used to detect the paging message can be optimized, thereby reducing power consumption of the UE when the UE detects the paging message.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of this application.

In the specification and claims of the embodiments of the present invention, the terms such as "first" and "second" are used to distinguish between different objects, but are not used to describe a particular sequence of the objects. For example, a first occasion, a second occasion, and the like are used to distinguish between different occasions, but are not used to describe a particular sequence of the occasions. In the description of the embodiments of the present invention, unless otherwise specified, the meaning of "a plurality of" means two or more.

The term "and/or" in this specification describes an association relationship of associated objects, indicating that three relationships may exist. For example, A and/or B may indicate three cases: Only A exists, both A and B exist, and only B exists. A character "/" in this specification indicates an "or" relationship between associated objects. For example, A/B indicates A or B.

In the embodiments of the present invention, the term such as "exemplary" or "for example" is used to indicate an example, an instance, or a description. Any embodiment or design solution described as "exemplary" or "for example" in the embodiments of the present invention should not be construed as being more preferred or advantageous than other embodiments or design solutions. To be precise, the use of the term such as "exemplary" or "for example" is intended to present a related concept in a specific manner.

The following describes some concepts and/or terms related in a paging indication method, apparatus, and system provided in the embodiments of the present invention.

A bandwidth part (Bandwidth Part, BWP) is defined as follows: A cell served by a base station supports a relatively large bandwidth (referred to as a large bandwidth below), and UE may work on a plurality of relatively small bandwidths (referred to as a small bandwidth part below). A small bandwidth part, on which the UE may work, in the large bandwidth is referred to as a BWP.

According to the paging indication method, apparatus, and system provided in the embodiments of the present invention, UE can receive indication information from a network side device (the indication information is used to indicate a detection parameter used by the UE to detect a paging message), and determine a detection manner based on the detection parameter. Because the UE can determine, based on the detection parameter that is indicated in the indication information sent by the network side device and that is used by the UE to detect the paging message, the detection manner used by the UE to detect the paging message, and does not need to periodically detect the paging message or determine the detection manner used to detect the paging message, a quantity of times of detecting, by the UE, the paging message can be reduced, and the detection manner used to detect the paging message can be optimized, thereby reducing power consumption of the UE when the UE detects the paging message.

The paging indication method, apparatus, and system provided in the embodiments of the present invention may be applied to a communications system. Specifically, the paging indication method, apparatus, and system may be applied to a process in which the UE determines, in the communications system and based on the indication information sent by the network side device, the detection manner used to detect the paging message.

Figure 1:
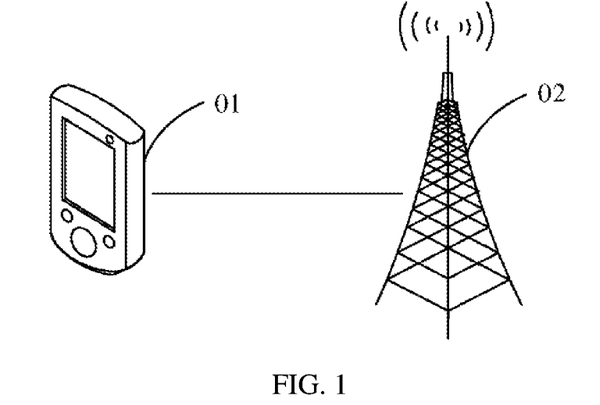
FIG. 1 is a schematic architectural diagram of a communications system according to an embodiment of the present invention.

For example, FIG. 1 is a schematic architectural diagram of a communications system according to an embodiment of the present invention. As shown in FIG. 1, the communications system may include UE 01 and a network side device (for example, a base station 02). A connection may be established between the UE 01 and the base station 02.

It should be noted that in this embodiment of the present invention, as shown in FIG. 1, the foregoing UE 01 and base station 02 may be in a wireless connection. To show a connection relationship between the UE 01 and the base station 02 more clearly, in FIG. 1, a solid line is used to show the connection relationship between the UE 01 and the base station 02.

The UE is a device providing voice and/or data connectivity to a user, a handheld device having a wired/wireless connection function, or another processing device connected to a wireless modem. The UE may communicate with one or more core network devices through a radio access network (Radio Access Network, RAN). The UE may be a mobile terminal such as a mobile phone (or referred to as a "cellular" phone) or a computer having a mobile terminal, or may be a portable, pocket-sized, handheld, computer built-in, or vehicle-mounted mobile apparatus, which exchanges language and/or data with the RAN. For example, the mobile apparatus is a device such as a personal communication service (Personal Communication Service, PCS) phone, a cordless phone, a session initiation protocol (SIP) phone, a wireless local loop (Wireless Local Loop, WLL) station, or a personal digital assistant (Personal Digital Assistant, PDA). The UE may be alternatively referred to as a user agent (User Agent), a terminal device, or the like.

The base station is an apparatus deployed in the RAN to provide a wireless communication function for the UE. The base station may include various forms of macro base stations, micro base stations, relay stations, access points, and the like. In systems using different wireless access technologies, names of devices having base station functions may be different. For example, in a 3rd generation mobile communications (3G) network, the device is referred to as a NodeB (NodeB); in a long term evolution (Long Term Evolution, LTE) system, the device is referred to as an evolved NodeB (evolved NodeB, eNB or eNodeB); and in a 5th generation mobile communications (5G) network, the device is referred to as a gNB. With evolution of the communications technology, the name of the "base station" may change.

The following describes in detail, through specific embodiments and application scenarios thereof with reference to the accompanying drawings, the paging indication method, apparatus, and system provided in the embodiments of the present invention.

Currently, in the prior art, UE blindly detects a PDCCH periodically. However, because the UE possibly may not detect a paging message of the UE in each period, periodical blind detection of the UE on the PDCCH causes relatively high power consumption of the UE.

To solve the foregoing technical problems, the embodiments of the present invention provide the paging indication method. The following uses interaction between UE and a network side device as an example to exemplarily describe the paging indication method provided in the embodiments of the present invention.

Figure 2:
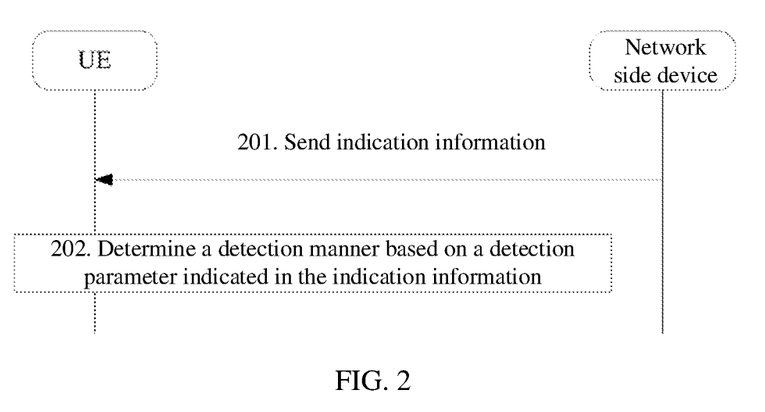
FIG. 2 is a first schematic diagram of a paging indication method according to an embodiment of the present invention.

Based on the communications system shown in FIG. 1, an embodiment of the present invention provides a paging indication method. As shown in FIG. 2, the paging indication method may include the following Step 201 and Step 202.

Step 201. A network side device sends indication information to UE.

In this embodiment of the present invention, the indication information is used to indicate a detection parameter used by the UE to detect a paging message, and the detection parameter is used to determine a detection manner used by the UE to detect the paging message.

Optionally, in this embodiment of the present invention, the detection parameter may include: whether the UE detects the paging message on a paging occasion (Paging Occasion, PO). The paging occasion is an occasion on which the UE detects the paging message in a first detection period, and the first detection period is at least one detection period after the UE receives the indication information.

It may be understood that in this embodiment of the present invention, if the indication information indicates that the UE detects the paging message on the paging occasion, the detection manner used by the UE to detect the paging message may be: The UE detects a paging PDCCH on the paging occasion.

Optionally, in this embodiment of the present invention, the detection parameter may include at least one of the following: whether the network side device sends a PDSCH on the paging occasion, a time-domain resource scheduling manner of the PDSCH used by the network side device to send the paging message, reference signal activation information of the network side device, an indication indicating that the network side device updates system information or warning information, a resource used by the network side device to send the paging message, or a control channel sending parameter used by the network side device to send the paging message.

Optionally, in this embodiment of the present invention, the detection parameter may include at least one of the following: whether the UE detects the PDSCH on the paging occasion, the time-domain resource scheduling manner of the PDSCH used by the paging message received by the UE, the reference signal activation information of the network side device received by the UE, the indication received by the UE and indicating that the network side device updates the system information or the warning information, a resource used by the UE to detect the paging message, or a control channel detection parameter used by the UE to detect the paging message.

Optionally, in this embodiment of the present invention, the time-domain resource scheduling manner of the PDSCH used by the network side device to send the paging message is: first sending a PDCCH and then sending the PDSCH, and whether a time interval between a first occasion and a second occasion is greater than a first threshold, where the first occasion is an occasion on which sending of the PDCCH is completed, and the second occasion is an occasion on which sending of the PDSCH indicated in the PDCCH is started.

Optionally, in this embodiment of the present invention, the reference signal activation information of the network side device may include: whether the network side device activates a reference signal, and which reference signal configuration is activated or which reference signal configurations are activated if the network side devices configures a plurality of optional reference signal configurations, for example, the network side device activates a channel state information-reference signal (Channel State Information-Reference Signal, CSI-RS) or tracking reference signal (Tracking Reference Signal, TRS) configuration.

It may be understood that in this embodiment of the present invention, the indication indicating that the network side device updates the system information or the warning information may be understood as that the network side device indicates to the UE that the network side device has updated the system information or the warning information.

It should be noted that in this embodiment of this application, because the paging PDCCH also includes the indication of the system information or warning information update, after receiving the indication of the system information or warning information update on a new PDCCH, the UE may ignore the indication of the system information update in the paging PDCCH.

Optionally, in this embodiment of the present invention, the resource used by the network side device to send the paging message may be a BWP used by the network side device to send the paging message.

Optionally, in this embodiment of the present invention, the resource used by the UE to detect the paging message may be a BWP used by the UE to detect the paging message. It should be noted that in this embodiment of this application, control resource sets (Control Resource Set, CORESET) on different BWPs correspond to different CORESET identifiers. When a plurality of BWPs are configured, a plurality of different CORESET identifiers may be directly configured, to correspond to a plurality of different BWPs.

Optionally, in this embodiment of this application, the control channel sending parameter may include at least one of an aggregation level and physical resource information. The aggregation level is an aggregation level of a control channel used by the network side device to send a paging control channel, the physical resource information is a start index of a control channel element on which the network side device sends the control channel, or the control channel element is a control channel element in the control channel used by the network side device to send the paging message.

Optionally, in this embodiment of this application, the control channel detection parameter may include at least one of an aggregation level and physical resource information. The aggregation level is the aggregation level of the control channel that is used by the network side device to send the paging control channel and that is received by the UE, the physical resource information is the start index of the control channel element on which the UE detects the control channel, or the control channel element is a control channel element in the control channel on which the UE detects the paging message.

It may be understood that a quantity of control channel elements (Control Channel Element, CCE) forming one control channel (for example, one PDCCH) generally is referred to as an aggregation level (aggregation level). For example, the aggregation level may be 4 CCEs, 8 CCEs, or 16 CCEs.

Correspondingly, the UE receives the indication information sent by the network side device.

Optionally, in this embodiment of the present invention, a time interval between a third occasion and the paging occasion is predefined in a communications protocol, or the time interval is configured by the network side device for the UE. The third occasion is an occasion on which the UE receives the indication information, the paging occasion is an occasion on which the UE detects the paging message in a first detection period, and the first detection period is at least one detection period after the UE receives the indication information.

Step 202. The UE determines the detection manner based on the detection parameter indicated in the indication information. Optionally, in this embodiment of this application, if the detection parameter includes that the UE detects the paging message on the paging occasion, the UE detects the paging PDCCH on the paging occasion. Otherwise, the UE does not detect the paging PDCCH (to be specific, the UE is in a sleep state).

In a possible implementation, before detecting the paging PDCCH, if the UE in an idle (idle) mode receives the indication information sent by the network side device, the UE may detect the paging PDCCH on the paging occasion. Otherwise, the UE does not detect the paging PDCCH (to be specific, the UE continues to be in the sleep state).

It should be noted that the paging message may be used to indicate the system information update or used to page the UE. The indication of the system information update is transmitted on the paging PDCCH, and information for paging the UE is transmitted on the PDSCH indicated in the paging PDCCH. If the paging message is used to indicate the system information update, but is not used to page the UE, only the PDCCH may be detected during transmission of the paging message, and there is no need to detect the PDSCH indicated in the PDCCH. If the PDSCH indicated in the PDCCH needs to be detected, the UE needs to reserve a buffer (Buffer) for the PDSCH, to store the PDSCH.

Optionally, in this embodiment of this application, if the detection parameter includes that the UE detects the paging message on the paging occasion and the UE does not need to detect the PDSCH on the paging occasion, the detection manner may be: The UE detects the paging PDCCH on the paging occasion, and does not detect the PDSCH on the paging occasion. In this way, when detecting the paging message, the UE does not reserve the buffer (Buffer) for the PDSCH, and does not perform signal processing such as receiving and sampling on a signal other than the PDCCH.

In this embodiment of this application, because the UE does not reserve the buffer for the PDSCH and does not perform signal processing such as receiving and sampling on the signal other than the PDCCH when determining that the detection manner is to not detect the PDSCH on the paging occasion, power consumption of the UE can be reduced.

It may be understood that in this embodiment of the present invention, the UE may determine, based on the time-domain resource scheduling manner of the PDSCH used by the network side device to send the paging message, that the detection manner used by the UE to detect the paging message is: first detecting the PDCCH and then detecting the PDSCH.

Figure 3:
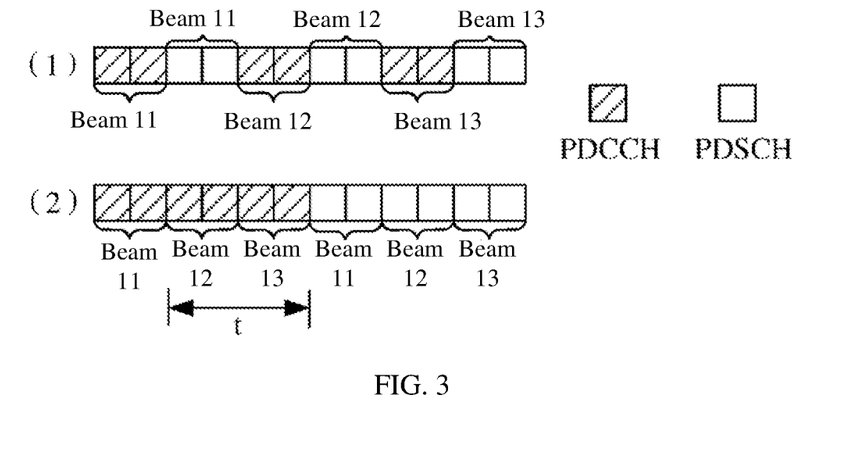
FIG. 3 is a schematic diagram of an example of a time-domain resource scheduling manner according to an embodiment of the present invention.

For example, as shown in (1) of FIG. 3, the time-domain resource scheduling manner of the PDSCH used by the network side device to send the paging message is: alternately sending the PDCCH and the PDSCH (for example, first sending a PDCCH corresponding to a beam 11, then sending a PDSCH indicated in the PDCCH corresponding to the beam 11, and so on). In this case, a time interval between a first occasion (for example, an occasion on which sending of the PDCCH corresponding to the beam 11 is completed) and a second occasion (for example, an occasion on which sending of the PDSCH indicated in the PDCCH corresponding to the beam 11 is started) is 0 (to be specific, the time interval is less than the first threshold). As shown in (2) of FIG. 3, the time-domain resource scheduling manner of the PDSCH used by the network side device to send the paging message is: sending the PDSCH after sending of the PDCCH is completed (for example, first sending PDCCHs respectively corresponding to a beam 11, a beam 12, and a beam 13, and then sending PDSCHs indicated in the PDCCHs respectively corresponding to the beam 11, the beam 12, and the beam 13). In this case, a time interval t between a first occasion (for example, an occasion on which sending of the PDCCH corresponding to the beam 11 is completed) and a second occasion (for example, an occasion on which sending of the PDSCH indicated in the PDCCH corresponding to the beam 11 is started) is greater than the first threshold.

It can be learned with reference to (1) and (2) of FIG. 3 that when the time-domain resource scheduling manner of the PDSCH used by the network side device to send the paging message is: sending the PDSCH after sending of the PDCCH is completed, the time interval between the first occasion and the second occasion is relatively large (to be specific, the time interval t between the first occasion and the second occasion is greater than the first threshold). Then, based on the time-domain resource scheduling manner (the manner in (2) of FIG. 3) of the PDSCH used by the network side device to send the paging message, after detecting the PDCCH, the UE may have sufficient time to determine a size of a buffer to be reserved for receiving the PDSCH indicated in the PDCCH, and does not need to pre-reserve a buffer for receiving the PDSCH indicated in the PDCCH. In this way, it can be avoided that the UE pre-reserves an unnecessary buffer, thereby reducing power consumption of the UE.

Optionally, in this embodiment of this application, the UE may receive, based on the reference signal activation information of the network side device, the corresponding reference signal, and perform time-frequency synchronization based on the received reference signal. After the UE completes time-frequency synchronization, performance of detecting the paging PDCCH or the PDSCH can be improved, or the UE may perform radio resource management (Radio Resource Management, RRM) measurement based on the activated reference signal.

Optionally, in this embodiment of this application, the paging message may be transmitted on a plurality of BWPs. The UE may switch, based on a BWP used by the UE to detect the paging message, to the corresponding BWP to detect the paging message. In this way, a quantity of times of detecting, by the UE, the paging message can be reduced, thereby reducing power consumption of the UE.

Optionally, in this embodiment of this application, when the UE detects the paging message based on the control channel detection parameter used by the UE to detect the paging message, a quantity of times of blindly detecting, by the UE, the PDCCH can be reduced, thereby reducing power consumption of the UE.

According to the paging indication method provided in this embodiment of this application, the UE can receive the indication information from the network side device (the indication information is used to indicate the detection parameter used by the UE to detect the paging message), and determine the detection manner based on the detection parameter. Because the UE can determine, based on the detection parameter that is indicated in the indication information sent by the network side device and that is used by the UE to detect the paging message, the detection manner used by the UE to detect the paging message, and does not need to periodically detect the paging message or determine the detection manner used to detect the paging message, a quantity of times of detecting, by the UE, the paging message can be reduced, and the detection manner used to detect the paging message can be optimized, thereby reducing power consumption of the UE when the UE detects the paging message.

Figure 4:
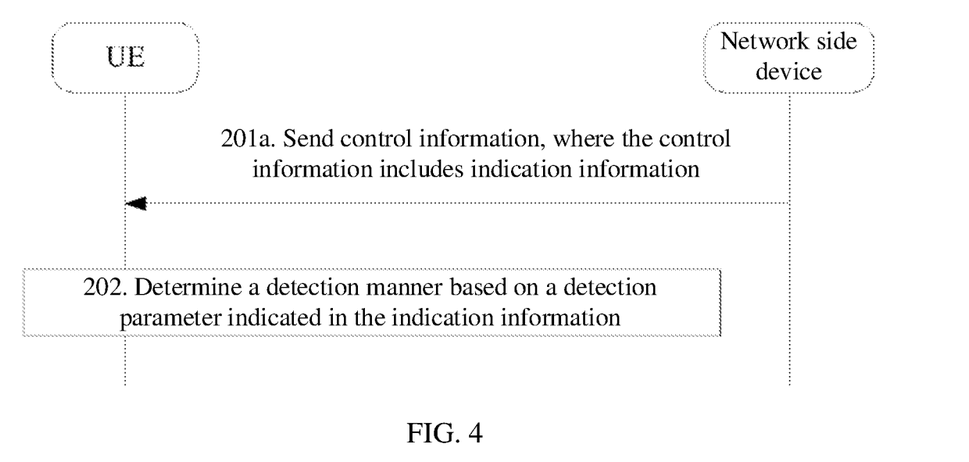
FIG. 4 is a second schematic diagram of a paging indication method according to an embodiment of the present invention.

Optionally, in this embodiment of the present invention, with reference to FIG. 2, as shown in FIG. 4, the foregoing Step 201 may be specifically implemented by the following Step 201a.

Step 201a. The network side device sends control information to the UE, where the control information includes the indication information.

Optionally, in this embodiment of this application, the network side device may send the PDCCH to the UE, where the PDCCH includes the control information.

Optionally, in this embodiment of this application, the control information may be downlink control information (Downlink Control Information, DCI) on the PDCCH.

Optionally, in this embodiment of the present invention, the control information may be scrambled by using a new paging-radio network temporary identifier (Paging-Radio Network Temporary Identifier, P-RNTI).

It should be noted that in this embodiment of this application, a bit sequence of the new P-RNTI may be different from a bit sequence of a conventional P-RNTI (for example, an RNTI of NR R15). For example, the new P-RNTI may be a PI-RNTI (paging indicator RNTI) or a P-RNTI2.

Optionally, in this embodiment of the present invention, a method for receiving, by the UE, the indication information sent by the network side device may be: receiving, by the UE, the control information from the network side device, and obtaining the indication information from the control information.

Figure 5:
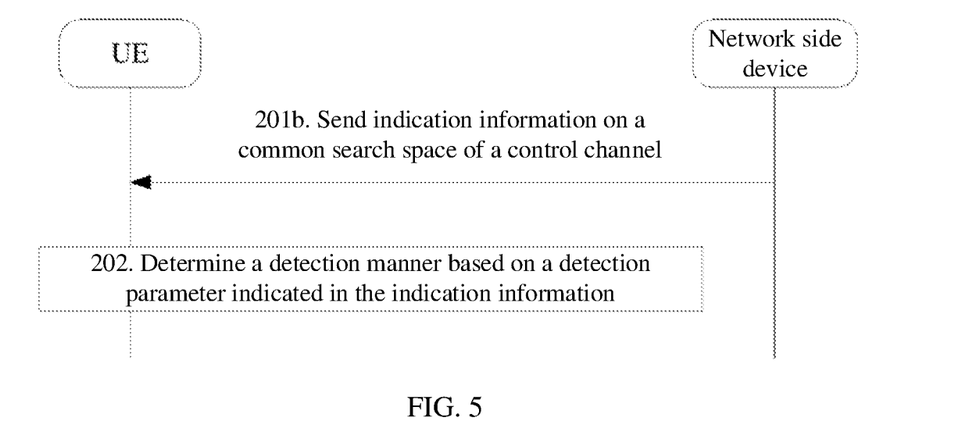
FIG. 5 is a third schematic diagram of a paging indication method according to an embodiment of the present invention.

Optionally, in this embodiment of the present invention, with reference to FIG. 2, as shown in FIG. 5, the foregoing Step 201 may be specifically implemented by the following Step 201b.

Step 201b. The network side device sends the indication information to the UE on a common search space of the control channel.

Optionally, in this embodiment of the present invention, a method for receiving, by the UE, the indication information sent by the network side device may be: receiving, by the UE, the indication information from the network side device on a common search space of a control channel of a cell on which the UE camps.

In this embodiment of the present invention, the UE can obtain the indication information from the control channel sent by the network side device, or can receive the indication information from the network side device on the common search space of the control channel of the cell on which the UE camps. In this way, the UE can determine the detection manner based on the detection parameter indicated in the indication information.

Figure 6:
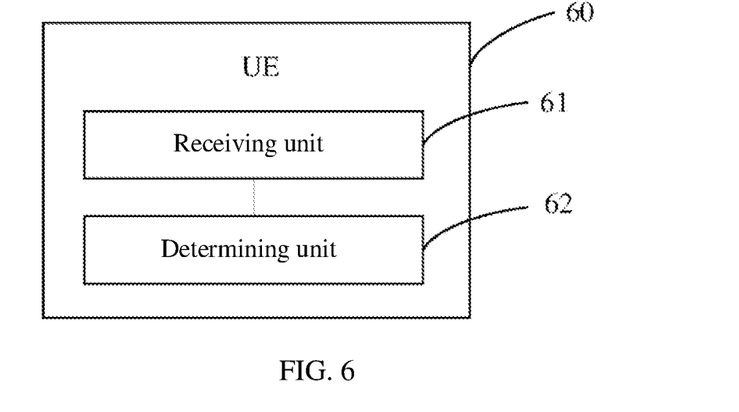
FIG. 6 is a schematic structural diagram of UE according to an embodiment of the present invention.

FIG. 6 is a possible schematic structural diagram of UE according to an embodiment of the present invention. As shown in FIG. 6, the UE 60 provided in this embodiment of the present invention may include a receiving unit 61 and a determining unit 62.

The receiving unit 61 is configured to receive indication information from a network side device, where the indication information is used to indicate a detection parameter used by the UE to detect a paging message, and the detection parameter is used to determine a detection manner used by the UE to detect the paging message. The determining unit 62 is configured to determine the detection manner based on the detection parameter indicated in the indication information received by the receiving unit 61.

In a possible implementation, the detection parameter may include whether the UE detects the paging message on a paging occasion, where the paging occasion is an occasion on which the UE detects the paging message in a first detection period, and the first detection period is at least one detection period after the UE receives the indication information.

In a possible implementation, the detection parameter may further include at least one of the following: whether to send a PDSCH on the paging occasion, a time-domain resource scheduling manner of the PDSCH used to send the paging message, reference signal activation information, an indication of system information or warning information update, a resource used to send the paging message, or a control channel sending parameter of the paging message.

In a possible implementation, the resource used to send the paging message may be a BWP used to send the paging message.

In a possible implementation, the control channel sending parameter may include at least one of an aggregation level and physical resource information. The aggregation level is an aggregation level of a control channel used by the network side device to send the paging message, the physical resource information is a start index of a control channel element on which the network side device sends the control channel, or the control channel element is a control channel element in the control channel used by the network side device to send the paging message.

In a possible implementation, the time-domain resource scheduling manner of the PDSCH used to send the paging message may be: first sending a PDCCH and then sending the PDSCH, and whether a time interval between a first occasion and a second occasion is greater than a first threshold, where the first occasion is an occasion on which sending of the PDCCH is completed, and the second occasion is an occasion on which sending of the PDSCH indicated in the PDCCH is started.

In a possible implementation, a time interval between a third occasion and the paging occasion is predefined in a communications protocol, or the time interval is configured by the network side device for the UE. The third occasion is an occasion on which the UE receives the indication information.

In a possible implementation, the receiving unit 61 is specifically configured to receive control information from the network side device, where the control information includes the indication information; and obtain the indication information from the control information.

In a possible implementation, the receiving unit 61 is specifically configured to receive the indication information from the network side device on a common search space of a control channel of a cell on which the UE camps.

The UE provided in this embodiment of the present invention can implement the processes implemented by the UE in the foregoing method embodiments. To avoid repetition, details are not described herein again.

According to the UE provided in this embodiment of this application, the UE can receive the indication information (the indication information is used to indicate the detection parameter used by the UE to detect the paging message) from the network side device, and determine the detection manner based on the detection parameter. Because the UE can determine, based on the detection parameter that is indicated in the indication information sent by the network side device and that is used by the UE to detect the paging message, the detection manner used by the UE to detect the paging message, and does not need to periodically detect the paging message or determine the detection manner used to detect the paging message, a quantity of times of detecting, by the UE, the paging message can be reduced, and the detection manner used to detect the paging message can be optimized, thereby reducing power consumption of the UE when the UE detects the paging message.

Figure 7:
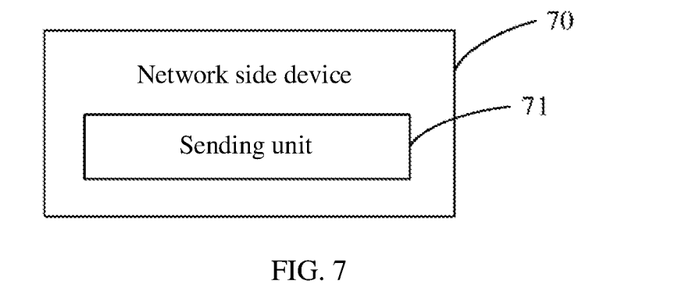
FIG. 7 is a schematic structural diagram of a network side device according to an embodiment of the present invention.

FIG. 7 is a possible schematic structural diagram of a network side device according to an embodiment of the present invention. As shown in FIG. 7, the network side device 70 provided in this embodiment of the present invention may include a sending unit 71.

The sending unit 71 is configured to send indication information to UE, where the indication information is used to indicate a detection parameter used by the UE to detect a paging message, and the detection parameter is used to determine a detection manner used by the UE to detect the paging message.

In a possible implementation, the detection parameter may include whether the UE detects a PDCCH on a paging occasion, where the paging occasion is an occasion on which the UE detects the paging message in a first detection period, and the first detection period is at least one detection period after the UE receives the indication information.

In a possible implementation, the detection parameter may further include at least one of the following: whether to send a PDSCH on the paging occasion, a time-domain resource scheduling manner of the PDSCH used to send the paging message, reference signal activation information, an indication of system information or warning information update, a resource used to send the paging message, or a control channel sending parameter of the paging message.

In a possible implementation, the resource used to send the paging message may be a BWP used to send the paging message.

In a possible implementation, the control channel detection parameter may include at least one of an aggregation level and physical resource information. The aggregation level is an aggregation level of a control channel used by the network side device to send the paging message, the physical resource information is a start index of a control channel element on which the network side device sends the control channel, or the control channel element is a control channel element in the control channel used by the network side device to send the paging message.

In a possible implementation, the time-domain resource scheduling manner of the PDSCH used to send the paging message may be: first sending the PDCCH and then sending the PDSCH, and whether a time interval between a first occasion and a second occasion is greater than a first threshold, where the first occasion is an occasion on which sending of the PDCCH is completed, and the second occasion is an occasion on which sending of the PDSCH indicated in the PDCCH is started.

In a possible implementation, a time interval between a third occasion and the paging occasion is predefined in a communications protocol, or the time interval is configured by the network side device for the UE. The third occasion is an occasion on which the UE receives the indication information.

In a possible implementation, the sending unit 71 is specifically configured to send control information to the UE, where the control information includes the indication information.

In a possible implementation, the sending unit 71 is specifically configured to send the indication information to the UE on a common search space of the control channel.

The network side device provided in this embodiment of the present invention can implement the processes implemented by the network side device in the foregoing method embodiments. To avoid repetition, details are not described herein again.

According to the network side device provided in this embodiment of this application, the network side device can send the indication information to the UE, where the indication information is used to indicate the detection parameter used by the UE to detect the paging message, and the detection parameter is used to determine the detection manner used by the UE to detect the paging message. Because the UE can determine, based on the detection parameter that is indicated in the indication information sent by the network side device and that is used by the UE to detect the paging message, the detection manner used by the UE to detect the paging message, and does not need to periodically detect the paging message or determine the detection manner used to detect the paging message, a quantity of times of detecting, by the UE, the paging message can be reduced, and the detection manner used to detect the paging message can be optimized, thereby reducing power consumption of the UE when the UE detects the paging message.

Figure 8:
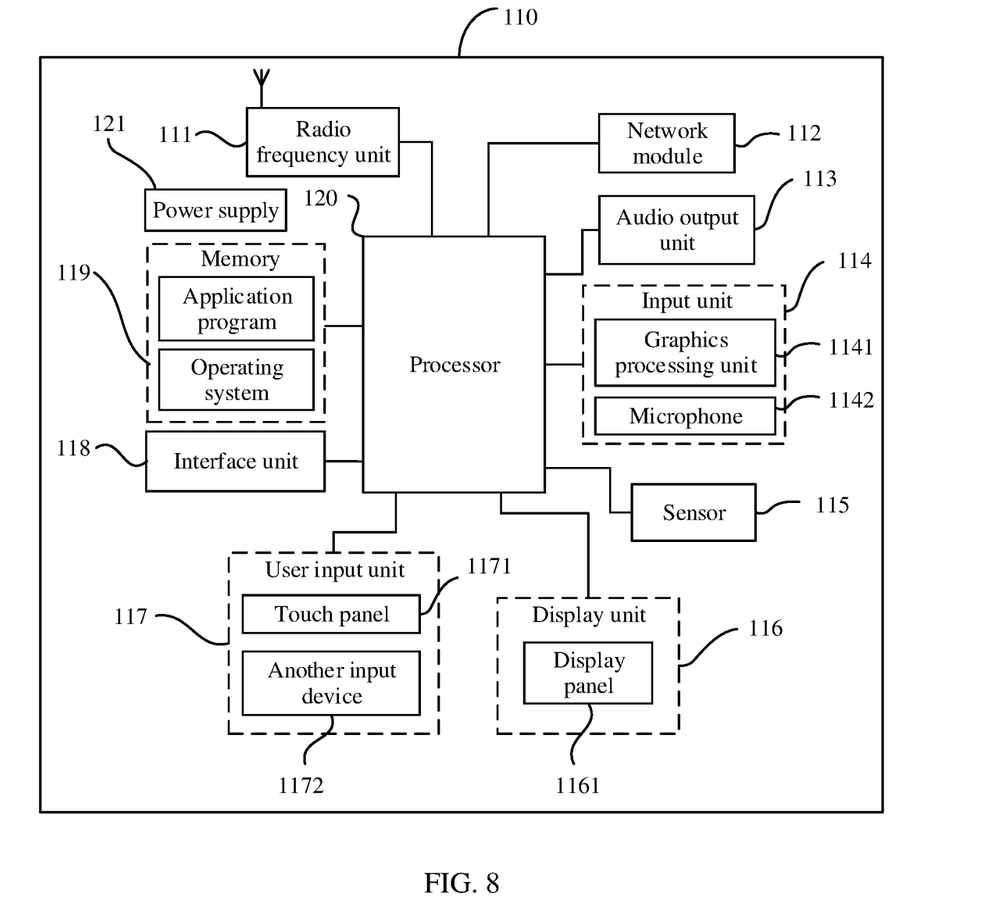
FIG. 8 is a schematic diagram of hardware of UE according to an embodiment of the present invention.

FIG. 8 is a schematic diagram of hardware of UE according to an embodiment of the present invention. As shown in FIG. 8, the UE 110 includes but is not limited to: a radio frequency unit 111, a network module 112, an audio output unit 113, an input unit 114, a sensor 115, a display unit 116, a user input unit 117, an interface unit 118, a memory 119, a processor 120, a power supply 121, and other components.

It should be noted that a person skilled in the art may understand that the structure of the UE shown in FIG. 8 does not constitute a limitation to the UE. The UE may include more or fewer components than those shown in FIG. 8, or some components may be combined, or a different component arrangement may be used. For example, in this embodiment of the present invention, the UE includes but is not limited to a mobile phone, a tablet computer, a notebook computer, a palmtop computer, a vehicle-mounted terminal, a wearable device, and a pedometer.

The processor 120 may be configured to receive indication information from a network side device, where the indication information is used to indicate a detection parameter used by the UE to detect a paging message, and the detection parameter is used to determine a detection manner used by the UE to detect the paging message; and determine the detection manner based on the detection parameter.

According to the UE provided in this embodiment of this application, the UE can receive the indication information (the indication information is used to indicate the detection parameter used by the UE to detect the paging message) from the network side device, and determine the detection manner based on the detection parameter. Because the UE can determine, based on the detection parameter that is indicated in the indication information sent by the network side device and that is used by the UE to detect the paging message, the detection manner used by the UE to detect the paging message, and does not need to periodically detect the paging message or determine the detection manner used to detect the paging message, a quantity of times of detecting, by the UE, the paging message can be reduced, and the detection manner used to detect the paging message can be optimized, thereby reducing power consumption of the UE when the UE detects the paging message.

It should be understood that in this embodiment of the present invention, the radio frequency unit 111 may be configured to receive and transmit information, or receive and transmit signals during a call. Specifically, the radio frequency unit 111 receives downlink data from a base station, and transmits the downlink data to the processor 120 for processing; and in addition, transmits uplink data to the base station. Generally, the radio frequency unit 111 includes but is not limited to an antenna, at least one amplifier, a transceiver, a coupler, a low noise amplifier, and a duplexer. In addition, the radio frequency unit 111 may also communicate with another device by using a wireless communications system and network.

The UE provides a user with wireless broadband Internet access by using the network module 112, for example, helps the user send and receive emails, browse web pages, and access streaming media.

The audio output unit 113 may convert audio data received by the radio frequency unit 111 or the network module 112 or stored in the memory 119 into an audio signal, and output the audio signal into sound. In addition, the audio output unit 113 may also provide audio output related to a specific function performed by the UE 110 (for example, call signal receiving sound or message receiving sound). The audio output unit 113 includes a loudspeaker, a buzzer, a receiver, and the like.

The input unit 114 is configured to receive audio or video signals. The input unit 114 may include a graphics processing unit (Graphics Processing Unit, GPU) 1141 and a microphone 1142. The graphics processing unit 1141 is configured to process image data of a static picture or a video obtained by an image capture apparatus (for example, a camera) in video capture mode or image capture mode. A processed image frame may be displayed on the display unit 116. The image frame processed by the GPU 1141 may be stored in the memory 119 (or another storage medium) or sent by the radio frequency unit 111 or the network module 112. The microphone 1142 may receive sound and can process such sound into audio data. The processed audio data can be converted, in a telephone call mode, into a format output that can be sent to a mobile communications base station by using the radio frequency unit 111.

The UE 110 further includes at least one sensor 115, for example, a light sensor, a motion sensor, and other sensors. Specifically, the light sensor includes an ambient light sensor and a proximity sensor, where the ambient light sensor may adjust brightness of a display panel 1161 based on brightness of ambient light, and the proximity sensor may turn off the display panel 1161 and/or backlight when the UE 110 is moved towards the ear. As a motion sensor, an accelerometer sensor may detect magnitude of acceleration in various directions (usually three axes), may detect magnitude and the direction of gravity when stationary, may be configured to identify UE postures (for example, horizontal and vertical screen switch, related games, and magnetometer posture calibration), may perform functions related to vibration identification (such as a pedometer and a knock), and the like. The sensor 115 may further include a fingerprint sensor, a pressure sensor, an iris sensor, a molecular sensor, a gyroscope, a barometer, a hygrometer, a thermometer, an infrared sensor, or the like. Details are not described herein.

The display unit 116 is configured to display information entered by the user or information provided for the user. The display unit 116 may include the display panel 1161, and the display panel 1161 may be configured in a form of a liquid crystal display (Liquid Crystal Display, LCD), an organic light-emitting diode (Organic Light-Emitting Diode, OLED), or the like.

The user input unit 117 may be configured to receive input numeric or character information, and generate key signal inputs related to user settings and function control of the UE. Specifically, the user input unit 117 includes a touch panel 1171 and another input device 1172. The touch panel 1171, also called a touch screen, may collect a touch operation of the user on or near the touch panel 1171 (for example, an operation performed by the user on or near the touch panel 1171 by using any suitable object or accessory such as a finger or a stylus). The touch panel 1171 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 120, receives a command sent by the processor 120, and executes the command In addition, the touch panel 1171 may be implemented by using a plurality of types such as a resistive type, a capacitive type, an infrared ray, and a surface acoustic wave. The user input unit 117 may include another input device 1172 in addition to the touch panel 1171. Specifically, the another input device 1172 may include but is not limited to a physical keyboard, a function key (such as a volume control key or an on/off key), a trackball, a mouse, and a joystick. Details are not described herein again.

Further, the touch panel 1171 may cover the display panel 1161. When detecting a touch operation on or near the touch panel 1171, the touch panel 1171 transmits the touch operation to the processor 120 to determine a type of a touch event. Then, the processor 120 provides corresponding visual output on the display panel 1161 based on the type of the touch event. Although in FIG. 8, the touch panel 1171 and the display panel 1161 are used as two independent components to implement input and output functions of the UE, in some embodiments, the touch panel 1171 and the display panel 1161 may be integrated to implement the input and output functions of the UE. This is not specifically limited herein.

The interface unit 118 is an interface for connecting an external apparatus to the UE 110. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset jack, and the like. The interface unit 118 may be configured to receive an input (for example, data information and power) from the external apparatus and transmit the received input to one or more elements in the UE 110, or transmit data between the UE 110 and the external apparatus.

The memory 119 may be configured to store software programs and various data. The memory 119 may mainly include a program storage area and a data storage area. The program storage area may store an operating system, an application program required by at least one function (such as a sound playback function and an image playback function), and the like. The data storage area may store data (such as audio data and an address book) created based on the use of the mobile phone, and the like. In addition, the memory 119 may include a high-speed random access memory or a nonvolatile memory, for example, at least one disk storage device, a flash memory, or another volatile solid-state storage device.

The processor 120 is a control center of the UE, connects various parts of the entire UE by using various interfaces and circuits, and performs various functions of the UE and processes data by running or executing software programs and/or modules stored in the memory 119 and invoking data stored in the memory 119, to monitor the UE as a whole. The processor 120 may include one or more processing units. Optionally, the processor 120 may integrate an application processor with a modem processor. The application processor mainly processes the operating system, a user interface, the application program, and the like, and the modem processor mainly processes wireless communication. It may be understood that the foregoing modem processor may not be integrated into the processor 120.

The UE 110 may further include the power supply 121 (for example, a battery) configured to supply power to various components. Optionally, the power supply 121 may be logically connected to the processor 120 by using a power management system, to implement functions such as managing charging, discharging, and power consumption by using the power management system.

In addition, the UE 110 includes some function modules not shown. Details are not described herein. Optionally, an embodiment of the present invention further provides UE, including the processor 120 and the memory 119 that are shown in FIG. 8, and a computer program stored in the memory 119 and executable on the processor 120, where the computer program, when executed by the processor 120, implements the processes of the foregoing method embodiments, and the same technical effects can be achieved. To avoid repetition, details are not described herein again.

An embodiment of the present invention further provides a computer readable storage medium, where the computer readable storage medium stores a computer program, where the computer program, when executed by the processor 120 shown in FIG. 8, implements the processes of the foregoing method embodiments, and the same technical effects can be achieved. To avoid repetition, details are not described herein again. The computer readable storage medium may be a read-only memory (Read-Only Memory, ROM), a random access memory (Random Access Memory, RAM), a magnetic disk, a compact disc, or the like.

Figure 9:
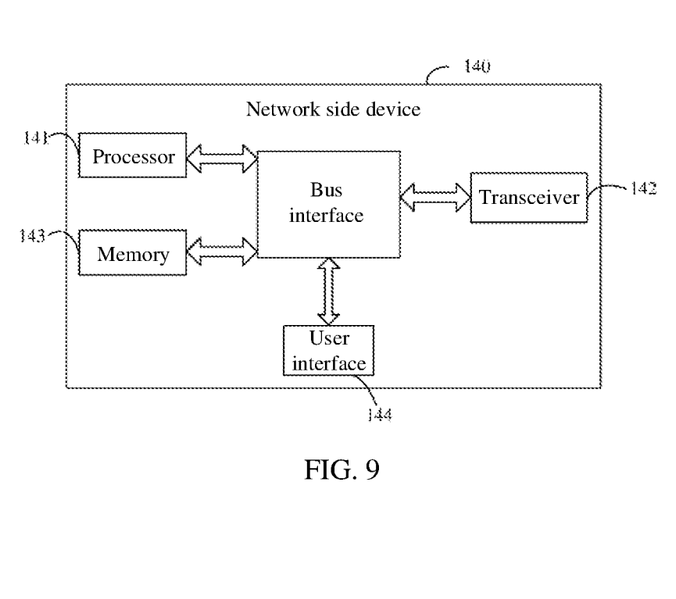
FIG. 9 is a schematic diagram of hardware of a network side device according to an embodiment of the present invention.

FIG. 9 is a schematic diagram of hardware of a network side device according to an embodiment of the present invention. As shown in FIG. 9, the network side device 140 includes: a processor 141, a transceiver 142, a memory 143, a user interface 144, and a bus interface.

The processor 141 may be configured to send indication information to UE, where the indication information is used to indicate a detection parameter used by the UE to detect a paging message, and the detection parameter is used to determine a detection manner used by the UE to detect the paging message.

According to the network side device provided in this embodiment of this application, the network side device can send the indication information to the UE, where the indication information is used to indicate the detection parameter used by the UE to detect the paging message, and the detection parameter is used to determine the detection manner used by the UE to detect the paging message. Because the UE can determine, based on the detection parameter that is indicated in the indication information sent by the network side device and that is used by the UE to detect the paging message, the detection manner used by the UE to detect the paging message, and does not need to periodically detect the paging message or determine the detection manner used to detect the paging message, a quantity of times of detecting, by the UE, the paging message can be reduced, and the detection manner used to detect the paging message can be optimized, thereby reducing power consumption of the UE when the UE detects the paging message.

The processor 141 may be responsible for managing a bus architecture and general processing, and may be configured to read and execute programs in the memory 143 to implement processing functions and control on the network side device 140. The memory 143 may store data used by the processor 141 when the processor 141 performs an operation. The processor 141 and the memory 143 may be integrated together or disposed separately.

In this embodiment of the present invention, the network side device 140 may further include: a computer program stored in the memory 143 and executable on the processor 141, where the computer program, when executed by the processor 141, implements the steps of the methods provided in the embodiments of the present invention.

In FIG. 9, the bus architecture may include any quantity of interconnected buses and bridges, which are specifically connected together by various circuits of one or more processors represented by the processor 141 and a memory represented by the memory 143. The bus architecture may further connect together various other circuits of a peripheral device, a voltage stabilizer, a power management circuit, and the like, which are known in the art and will not be further described in this embodiment of the present invention. The bus interface provides an interface. The transceiver 142 may include a plurality of elements, that is, include a transmitter and a receiver, and provide units for communication with various other apparatuses on a transmission medium. For different UE, the user interface 144 may alternatively be an interface for externally and internally connecting required equipment. The connected equipment includes but is not limited to a keypad, a display, a speaker, a microphone, a joystick, and the like.

It should be noted that in this specification, the terms "comprise", "include" and any other variants thereof are intended to cover non-exclusive inclusion, so that a process, a method, an article, or an apparatus that includes a series of elements not only includes these very elements, but also includes other elements not expressly listed, or includes elements inherent to this process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from the protection scope of aims of this application and claims, all of which fall within the protection of this application.

The invention claimed is:

1. A paging indication method, performed by a user equipment (UE), wherein the method comprises:
   receiving, by the UE, information from a network side device, wherein the information comprises a detection parameter for the UE to determine a paging message sent on a paging occasion, wherein the detection parameter further comprises a detection manner that informs the UE as to how to detect the paging message; and determining, by the UE, the detection manner based on the detection parameter; and
   wherein the detection manner is to request the UE to detect the paging message in a first detection period after the UE received the information, wherein the paging message indicates to the UE that a paging Physical Downlink Control Channel (PDCCH) carries transmission information of a Physical Downlink Shared Channel (PDSCH) within the PDCCH.

2. The method according to claim 1, wherein the first detection period is at least one detection period after the UE receives the information.

3. The method according to claim 2, wherein the detection parameter further comprises at least one of the following: a time-domain resource scheduling manner of a PDSCH used to send the paging message,
   reference signal activation information, an indication of system information or warning information update, a resource used to send the paging message, or a control channel sending parameter of the paging message.

4. The method according to claim 3, wherein the resource used to send the paging message is a bandwidth part (BWP) used to send the paging message.

5. The method according to claim 3, wherein the control channel sending parameter comprises at least one of: an aggregation level and physical resource information, wherein the aggregation level is an aggregation level of a control channel used by the network side device to send the paging message, the physical resource information is starting index of a control channel element on which the network side device sends the control channel, or the control channel element is a control channel element in the control channel used by the network side device to send the paging message.

6. The method according to claim 3, wherein the time-domain resource scheduling manner of the PDSCH used to send the paging message is: first sending a PDCCH and then sending the PDSCH, and whether a time interval between a first occasion and a second occasion is greater than a first threshold, wherein
   the first occasion is an occasion on which sending of the PDCCH is completed, and the second occasion is an occasion on which sending of the PDSCH indicated in the PDCCH is started.

7. The method according to claim 2, wherein a time interval between a third occasion and the paging occasion is predefined in a communications protocol, or the time interval is configured by the network side device for the UE, wherein
   the third occasion is an occasion on which the UE receives the indication information.

8. The method according to claim 1, wherein the receiving information from a network side device comprises:
   receiving control information from the network side device, wherein the control information comprises the information; and obtaining the information from the control information.

9. A User equipment (UE), comprising: a processor, a memory, and a program stored in the memory and executable on the processor, wherein when executing the program, the processor is configured to:
   receive, by the UE, information from a network side device, wherein the information comprises a detection parameter for the UE to determine a paging message sent on a paging occasion, wherein the detection parameter further comprises a detection manner that informs the UE as to how to detect the paging message; and determine, by the UE, the detection manner based on the detection parameter; and
   wherein the detection manner is to request the UE to detect the paging message in a first detection period after the UE received the information, wherein the paging message indicates to the UE that a paging Physical Downlink Control Channel (PDCCH) carries transmission information of a Physical Downlink Shared Channel (PDSCH) within the PDCCH.

10. The UE according to claim 9, wherein the first detection period is at least one detection period after the UE receives the information.

11. The UE according to claim 10, wherein the detection parameter further comprises at least one of the following: a time-domain resource scheduling manner of a PDSCH used to send the paging message,
   reference signal activation information, an indication of system information or warning information update, a resource used to send the paging message, or a control channel sending parameter of the paging message.

12. The UE according to claim 11, wherein the resource used to send the paging message is a bandwidth part (BWP) used to send the paging message.

13. The UE according to claim 11, wherein the control channel sending parameter comprises at least one of: an aggregation level and physical resource information, wherein the aggregation level is an aggregation level of a control channel used by the network side device to send the paging message, the physical resource information is starting index of a control channel element on which the network side device sends the control channel, or the control channel element is a control channel element in the control channel used by the network side device to send the paging message.

14. The UE according to claim 11, wherein the time-domain resource scheduling manner of the PDSCH used to send the paging message is: first sending a PDCCH and then sending the PDSCH, and whether a time interval between a first occasion and a second occasion is greater than a first threshold, wherein
the first occasion is an occasion on which sending of the PDCCH is completed, and the second occasion is an occasion on which sending of the PDSCH indicated in the PDCCH is started.

15. The UE according to claim 10, wherein a time interval between a third occasion and the paging occasion is pre-defined in a communications protocol, or the time interval is configured by the network side device for the UE, wherein
the third occasion is an occasion on which the UE receives the information.

16. A network side device, comprising: a processor, a memory, and a program stored in the memory and executable on the processor, wherein when executing the program, the processor is configured to:
send, by the network side device, information to a user equipment (UE), wherein the information comprises a detection parameter for the UE to determine a paging message sent on a paging occasion, wherein the detection parameter further comprises a detection manner that informs the UE as to how to detect the paging message; and
wherein the detection manner is to request the UE to detect the paging message in a first detection period after the UE received the information, wherein the paging message indicates to the UE that a paging Physical Downlink Control Channel (PDCCH) carries transmission information of a Physical Downlink Shared Channel (PDSCH) within the PDCCH.

17. The network side device according to claim 16, wherein the first detection period is at least one detection period after the UE receives the information.

18. The network side device according to claim 17, wherein the detection parameter further comprises at least one of the following:
a time-domain resource scheduling manner of the PDSCH used to send the paging message, reference signal activation information, an indication of system information or warning information update, a resource used to send the paging message, or a control channel sending parameter of the paging message.

19. The network side device according to claim 18, wherein the resource used to send the paging message is a bandwidth part (BWP) used to send the paging message.

20. The network side device according to claim 18, wherein the control channel sending parameter comprises at least one of: an aggregation level and physical resource information, wherein the aggregation level is an aggregation level of a control channel used by the network side device to send the paging message, the physical resource information is a start index of a control channel element on which the network side device sends the control channel, or the control channel element is a control channel element in the control channel used by the network side device to send the paging message; or
wherein the time-domain resource scheduling manner of the PDSCH used by the network side device to send the paging message is: first sending a PDCCH and then sending the PDSCH, and whether a time interval between a first occasion and a second occasion is greater than a first threshold, wherein the first occasion is an occasion on which sending of the PDCCH is completed, and the second occasion is an occasion on which sending of the PDSCH indicated in the PDCCH is started.

* * * * *